(12) United States Patent
Lee et al.

(10) Patent No.: US 8,089,638 B2
(45) Date of Patent: Jan. 3, 2012

(54) STAGE WITH DISPLACEMENT MAGNIFICATION MECHANISM FOR MEASURING

(76) Inventors: Deug Woo Lee, Busan (KR); Soo Chang Choi, Busan (KR); Jung Woo Park, Gimhae-si (KR)

( * ) Notice: Subject to any disclaimer, the term of this patent is extended or adjusted under 35 U.S.C. 154(b) by 125 days.

(21) Appl. No.: 12/373,460

(22) PCT Filed: Dec. 22, 2006

(86) PCT No.: PCT/KR2006/005675
§ 371 (c)(1),
(2), (4) Date: Jan. 12, 2009

(87) PCT Pub. No.: WO2008/007838
PCT Pub. Date: Jan. 17, 2008

(65) Prior Publication Data
US 2009/0323083 A1 Dec. 31, 2009

(30) Foreign Application Priority Data

Jul. 13, 2006 (KR) .................. 10-2006-0065664
Dec. 12, 2006 (KR) .................. 10-2006-0126116

(51) Int. Cl.
*G01B 11/14* (2006.01)
(52) U.S. Cl. ........ 356/614; 356/399; 177/151; 177/153; 177/25.11
(58) Field of Classification Search .............. 356/614, 356/399; 177/151, 153, 25.11
See application file for complete search history.

(56) References Cited

U.S. PATENT DOCUMENTS

| | | | | |
|---|---|---|---|---|
| 4,029,161 A | * | 6/1977 | Foster et al. | 177/25.15 |
| 5,363,196 A | * | 11/1994 | Cameron | 356/500 |
| 5,896,032 A | | 4/1999 | Yagi et al. | |
| 6,437,864 B1 | | 8/2002 | Watanabe et al. | |
| 6,462,828 B1 | * | 10/2002 | Takeishi | 356/500 |
| 6,493,062 B2 | * | 12/2002 | Tokuda et al. | 355/53 |
| 6,501,210 B1 | * | 12/2002 | Ueno | 310/331 |
| 7,042,576 B2 | | 5/2006 | Hattori | |

OTHER PUBLICATIONS

International Search Report mailed Apr. 11, 2007 for PCT/KR2006/005675.

* cited by examiner

*Primary Examiner* — Tarifur Chowdhury
*Assistant Examiner* — Isiaka Akanbi
(74) *Attorney, Agent, or Firm* — Lowe Hauptman Ham & Berner LLP

(57) ABSTRACT

The present invention relates to a stage with a displacement measuring means capable of measuring a displacement, and more particularly, to a stage provided with a displacement magnification means capable of magnifying a displacement so as to precisely measure a minute displacement on the order of nanometers. A stage according to an aspect of the present invention comprises a fixed base, a movable table, a first elastic support, a first actuator, a first displacement converting means and a first displacement measuring means. The movable table is installed to be movable with respect to the fixed base. The first elastic support supports the movable table with respect to the fixed base, and the first actuator generates a displacement of the movable table in one direction. The first displacement converting means is connected to the movable table and the fixed base so as to convert the unidirectional displacement of the movable table into a rotational displacement about a point thereof connected to the movable table. The first displacement measuring means measures the displacement converted by the first displacement converting means. The present invention provides a stage provided with a device capable of magnifying and measuring a displacement generated in a feeding table, thereby implementing a high measurement precision using a measurement device with a low precision.

11 Claims, 7 Drawing Sheets

STAGE WITH DISPLACEMENT MAGNIFICATION MECHANISM FOR MEASURING

CROSS REFERENCE TO RELATED APPLICATION

This application claims the priority of Korean Patent Application No. 10-2006-0065664, filed on Jul. 13, 2006 and the priority of Korean Patent Application No. 10-2006-0126116, filed on Dec. 12, 2006 in the KIPO (Korean Intellectual Property Office), the disclosure of which are incorporated herein in their entirety by reference. Further, this application is the National Phase application of International Application No. PCT/KR2006/005675, filed Dec. 22, 2006, which designates the United States and was published in English. Each of these applications is hereby incorporated by reference in their entirety into the present application.

TECHNICAL FIELD

The present invention relates to a stage with a displacement measuring means capable of measuring a displacement, and more particularly, to a stage provided with a displacement magnification means capable of magnifying a displacement so as to precisely measure a minute displacement on the order of nanometers.

BACKGROUND ART

Along with the development of nano technology, there have been conducted many studies on feeding devices for nano-scale ultra-precise displacement feeds and methods for precisely measuring feeds of the feeding devices. A conventional stage for measuring a feed on the order of nanometers employs a laser interferometer using a laser, or a constant voltage displacement sensor for measuring a displacement using electricity. However, this measurement device is based on the basic precision of a measurement system. That is, measurement of a displacement of 1 nm requires a measurement system with a precision on the order of 1 nm.

Thus, in order to more precisely measure a displacement, the conventional displacement measurement stage requires a more precise measurement system, leading to a problem of increases in the price of the measurement system. In addition, as the measurement system becomes more precise, it is more influenced by ambient environments, resulting in a degraded precision. Thus, in order to keep the precision of the measurement system, stable environments under which the measurement device can operate normally are required. Due to these reasons, environments should be subjected to control that requires a number of systems. Thus, there is a problem in that the measurement system is provided at high costs. Accordingly, there are problems in that the conventional displacement measurement stage can hardly keep its precision due to environmental factors and should be provided with expensive equipment.

DISCLOSURE OF INVENTION

Technical Problem

The present invention is conceived to solve the aforementioned problems of the conventional stage. Therefore, it is an object of the present invention to provide a stage having a displacement measurement system capable of measuring a displacement through magnification.

Technical Solution

A stage according to an aspect of the present invention comprises a fixed base, a movable table, a first elastic support, a first actuator, a first displacement converting means and a first displacement measuring means. The movable table is installed to be movable with respect to the fixed base. The first elastic support supports the movable table with respect to the fixed base, and the first actuator generates a displacement of the movable table in one direction. The first displacement converting means is connected to the movable table and the fixed base so as to convert the unidirectional displacement of the movable table into a rotational displacement about a point thereof connected to the movable table. The first displacement measuring means measures the displacement converted by the first displacement converting means.

In the stage, the first displacement converting means may comprise a rotational displacement converting lever having one end connected to the fixed base, and one side of the rotational displacement converting lever between the one end and the other end thereof may be connected to the movable table so that the rotational displacement converting lever pivots on the one end in proportion to the displacement of the movable table. In this case, when the first actuator generates a displacement, a displacement of the other end of the converting lever is magnified from the displacement of the movable table at a ratio of a distance between the one end and the one side of the converting lever to a distance between the one end and the other end of the converting lever. Thus, even though the movable table generates a minute displacement, it is possible to measure a magnified displacement at the other end of the converting lever.

Although the one end of the converting lever is connected to the fixed base so as to generate a magnified displacement at the other end of the converting lever in the stage, one side of the converting lever between the one end and the other end thereof may be connected to the fixed base. In this case, the one end of the converting lever should be connected to the movable table.

In addition, in the stage, the first displacement measuring means may comprise a first reflective plate, a first light emitting unit and a first light receiving unit. The first reflective plate may be installed at the first displacement converting means so as to reflect light thereon. The first light emitting unit may emit light toward the first light reflective plate, and the first light receiving unit may be installed to receive the light reflected by the first light reflective plate. Since the first reflective plate is installed at the first displacement converting means, if a minute displacement of the movable table is generated by means of the first actuator, the position of light measured in the first light receiving unit is changed. The amount of change in the position of light increases in proportion to a distance between the first reflective plate and the first light receiving unit. Thus, even though a minute displacement of the movable table is generated, the minute displacement of the movable table can be precisely measured in the first light receiving unit using the magnified change in the position of light.

In the case where the first displacement converting means of the stage comprises the converting lever, the first reflective plate may be installed at the other end of the converting lever. This is because the displacement at the other end of the converting lever becomes greatest when the converting lever pivots on one end thereof.

Further, in the stage, the first displacement converting means may comprise an arm having one end hingedly connected to the fixed base and the other end hingedly connected to the movable table.

Moreover, in the case where the first displacement converting means of the stage comprises the converting lever, the first displacement measuring means can measure a displacement of the other end of the converting lever.

In addition, in the case where the first displacement converting means of the stage comprises the converting lever, the stage may further comprise a first pivoting rod having one end hingedly connected to the other end of the converting lever and the other end hingedly connected to one side of the fixed base. In this case, the first displacement measuring means may comprise a first reflective plate installed at the first pivoting rod so as to reflect light thereon, a first light emitting unit for lighting light toward the first reflective plate, and a first light receiving unit for receiving the light reflected by the first reflective plate. Thus, the displacement generated in the movable table is primarily magnified by the converting lever and then secondarily magnified by the first pivoting rod and the first displacement measuring means.

The stage measures a unidirectional displacement. Thus, in order to measure a bidirectional displacement, the stage may further comprise a sub table, a second elastic support, a second actuator, a second displacement converting means and a second displacement measuring means. The sub table may be installed to be movable with respect to the movable table, and the second elastic support supports the sub table with respect to the movable table. In addition, the second actuator generates a displacement of the sub table in a direction perpendicular to the unidirectional displacement of the movable table. Moreover, the second displacement converting means may be connected to the movable table and the sub table so as to convert a displacement of the sub table into a rotational displacement about a point thereof connected to the movable table, and the second displacement measuring means may measure the displacement converted by the second displacement converting means. Thus, the displacement caused by the second actuator that generates a displacement perpendicularly to that generated by the first actuator may be magnified and measured by the second displacement converting means and the second displacement measuring means.

In addition, in the stage, the second displacement converting means may comprise a rotational displacement converting lever having one end connected to the movable table, and one side of the rotational displacement converting lever between the one end and the other end thereof may be connected to the sub table so as to pivot on the one end in proportion to the displacement of the sub table. Alternatively, a converting lever of the second displacement converting means may have one side between the one end and the other end thereof connected to the movable table, and the one end of the converting lever may be connected to the sub table so that the converting lever pivots on the one side in proportion to the displacement of the sub table. That is, the displacement of the sub table is magnified at the other end of the converting lever of the second displacement converting means.

In addition, in the stage, the second displacement measuring means may comprise a second reflective plate installed at the second displacement converting means so as to reflect light thereon, a second light emitting unit for emitting light toward the second reflective plate, and a second light receiving unit for receiving the light reflected by the second reflective plate.

In the case where the second displacement converting means comprises the converting lever, the second reflective plate may be installed at the other end of the converting lever of the second displacement converting means.

Moreover, in the stage, the second displacement converting means may comprise an arm having one end hingedly connected to the movable table and the other end hingedly connected to the sub table.

In addition, in the case where the second displacement converting means comprises the converting lever, the second displacement measuring means may measure a displacement of the other end of the converting lever of the second displacement converting means.

Furthermore, in the case where the second displacement converting means comprises the converting lever, the stage may further comprise a second pivoting rod having one end hingedly connected to the other end of the converting lever of the second displacement converting means and the other end hingedly connected to one side of the movable table. In this case, the second displacement measuring means may comprise a second reflective plate installed at the second pivoting rod so as to reflect light thereon, a second light emitting unit for emitting light toward the second reflective plate, and a second light receiving unit for receiving the light reflected by the second reflective plate.

A stage according to another aspect of the present invention comprises a fixed base, a rotating table, a first actuator, a first displacement converting means and a first displacement measuring means. The rotating table is installed to be rotatable, and the first actuator rotates the rotating table. In addition, the first displacement converting means is connected to the rotating table and the fixed base so as to convert a rotational displacement of the rotating table into a rotational displacement about a point thereof connected to the fixed base, and the first displacement measuring means measures the displacement converted by the first displacement converting means. Thus, the displacement generated in the rotating table is magnified and measured by the first displacement converting means and the first displacement measuring means.

In the stage, the first displacement converting means may comprise a converting lever having one side between one end and the other end thereof is connected to the fixed base, and the one end of the converting lever is connected to the rotating table so that the converting lever pivots on the one side in proportion to the displacement of the rotating table. Alternatively, the converting lever may have one end connected to the fixed base, and one side of the converting lever between the one end and the other end thereof may be connected to the rotating table so that the converting lever pivots on the one end in proportion to the displacement of the rotating table. Thus, the displacement of the rotating table is magnified at the other end of the converting lever.

In addition, in the stage, the first displacement measuring means may comprise a first reflective plate, a first light emitting unit and a first light receiving unit. The first reflective plate may be installed at the one side of the first displacement converting means so as to reflect light thereon. At this time, in the case where the first displacement converting means comprises the converting lever, the first reflective plate may be installed at the other end of the converting lever. In addition, the first light emitting unit may emit light toward the first reflective plate, and the first light receiving unit may receive the light reflected by the first reflective plate.

Moreover, in the stage, the first displacement converting means may comprise an arm having one end hingedly connected to the fixed base and the other end hingedly connected to the rotating table.

Furthermore, in the case where the first displacement converting means comprises the converting lever, the first displacement measuring means may measure a displacement of the other end of the converting lever.

In addition, in the stage, in the case where the first displacement converting means comprises the converting lever, the stage may further comprise a first pivoting rod having one end hingedly connected to the other end of the pivoting lever and the other end hingedly connected to one side of the fixed base. In this case, the first displacement measuring means may comprise a first reflective plate installed at the first pivoting rod so as to reflect light thereon, a first light emitting unit for emitting light toward the first reflective plate, and a first light receiving unit for receiving the light reflected by the first reflective plate.

BRIEF EXPLANATION OF REFERENCE NUMERALS IN DRAWINGS

1: Fixed base
3: Movable table
5: First actuator
7: First elastic support
9: First light emitting unit
10: First reflective plate
11: First arm
13: First light receiving unit
14: Sub table
15: Second actuator
17: Second elastic support
19: Second light emitting unit
20: Second reflective plate
21: Second arm
23: Second light receiving unit
41: Fixed base
43: Movable table
45: First actuator
47: First elastic support
49: First converting lever
54: Sub table
55: Second actuator
57: Second elastic support
59: Second converting lever
71: Fixed base
73: Rotating table

BEST MODE FOR CARRYING OUT THE INVENTION

Hereinafter, preferred embodiments of a stage according to the present invention will be described in detail with reference to the accompanying drawings.

Figure 1:
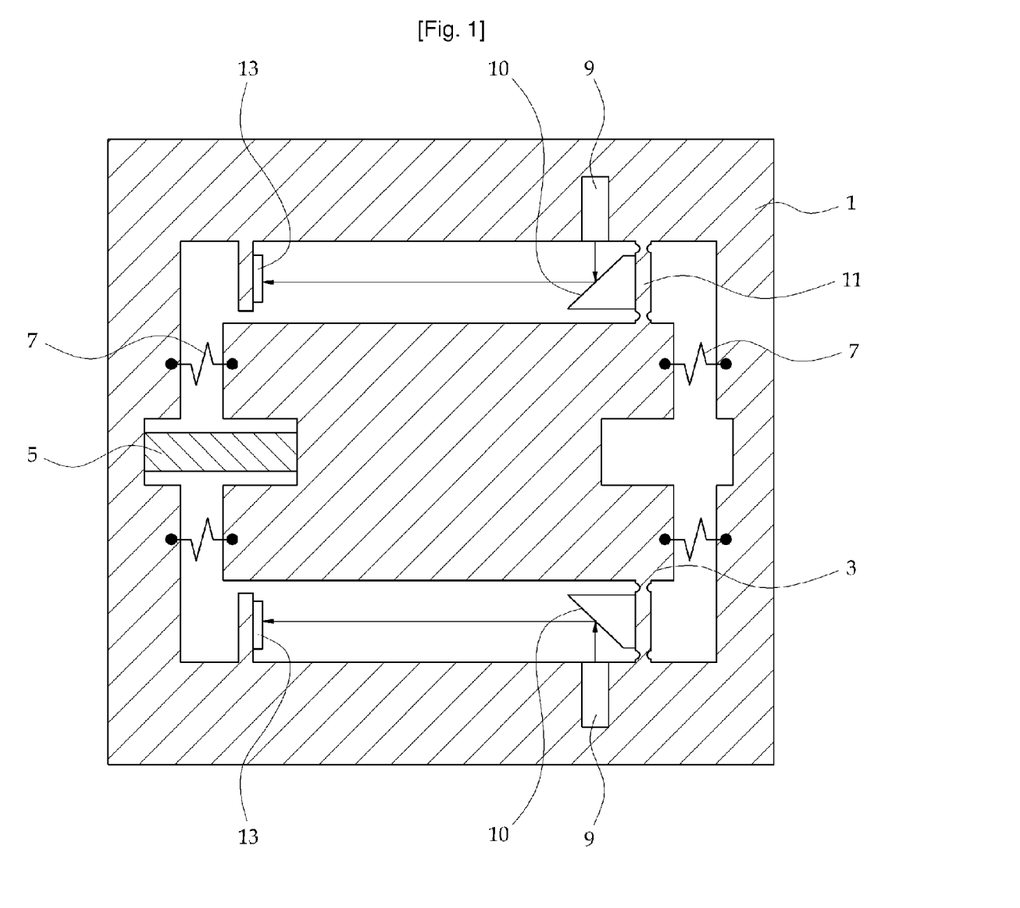
FIG. 1 is a conceptual view showing a stage according to a first embodiment of the present invention.

FIG. 1 is a conceptual view showing a stage according to a first embodiment of the present invention. The stage of FIG. 1 includes a fixed base 1, a movable table 3, first elastic supports 7, a first actuator 5, first arms 11, and first displacement measuring means.

The movable table 3 is installed to be movable with respect to the fixed base 1 while being spaced apart from the fixed base 1. The first elastic supports 7 serve as elastically supporting means and are connected to the fixed base 1 and the movable table 3. Thus, the movable table 3 is elastically supported to the fixed base 1 by means of the first elastic supports 7. The first actuator 5 is a means for generating a minute displacement, such as a Piezo actuator, and has one end fixed to the fixed base 1 and the other end fixed to the movable table. Each of the first arms 11 has one end hingedly connected to the fixed base 1, and the other end hingedly connected to the movable table 3.

Each of the first displacement measuring means includes a first light emitting unit 9, a first reflective plate 10 and a first light receiving unit 13. The first reflective plate 10 that is a means for reflecting light is attached to the first arm 11. The first light emitting unit 9 is a means for generating light, such as a laser generator. The first light emitting unit 9 is fixed to the fixed base 1 so that the generated light is emitted toward the first reflective plate 10. The first light receiving unit 13 is a precise CCD or other light-detectable devices. The light receiving unit 13 is installed to the fixed base 1 while being spaced apart by a certain distance from the first reflective plate 10 so as to receive the light that is emitted from the first light emitting unit 9 and reflected by the first reflective plate 10.

When the first actuator 5 generates a displacement, the movable table 3 linearly moves as much as the displacement generated by the first actuator 5. The first arm 11 has one end hingedly connected to the fixed base 1 and the other end hingedly connected to the movable table 3. Thus, if the movable table 3 linearly moves, the first arm 11 pivots on the one end. As a result, the linear displacement of the movable table 3 is converted into a rotational displacement of the first arm 11. Since the first reflective plate 10 is attached to the first arm 11, the first reflective plate 10 pivots together with the first arm 11 when the first arm 11 pivots. Since the first light emitting unit 9 is fixed to emit light toward the first reflective plate 10, the position of light received by the first light receiving unit 13 is changed due to the pivotal movement of the first reflective plate 10. Since the position of the received light is changed in proportion to the displacement of the movable table, measurement of the changed position of the received light enables measurement of the displacement of the movable table 3. In addition, since the change in the position of the received light is proportional to the spaced distance between the first light receiving unit 13 and the first reflective plate 10, the change in the position of the light received by the first light receiving unit 13 is magnified if the spaced distance between the first light receiving unit 13 and the first reflective plate 10 increases. Thus, even though the movable table 3 moves minutely, the minute displacement of the movable table 3 is magnified in the first light receiving unit 13.

Figure 2:
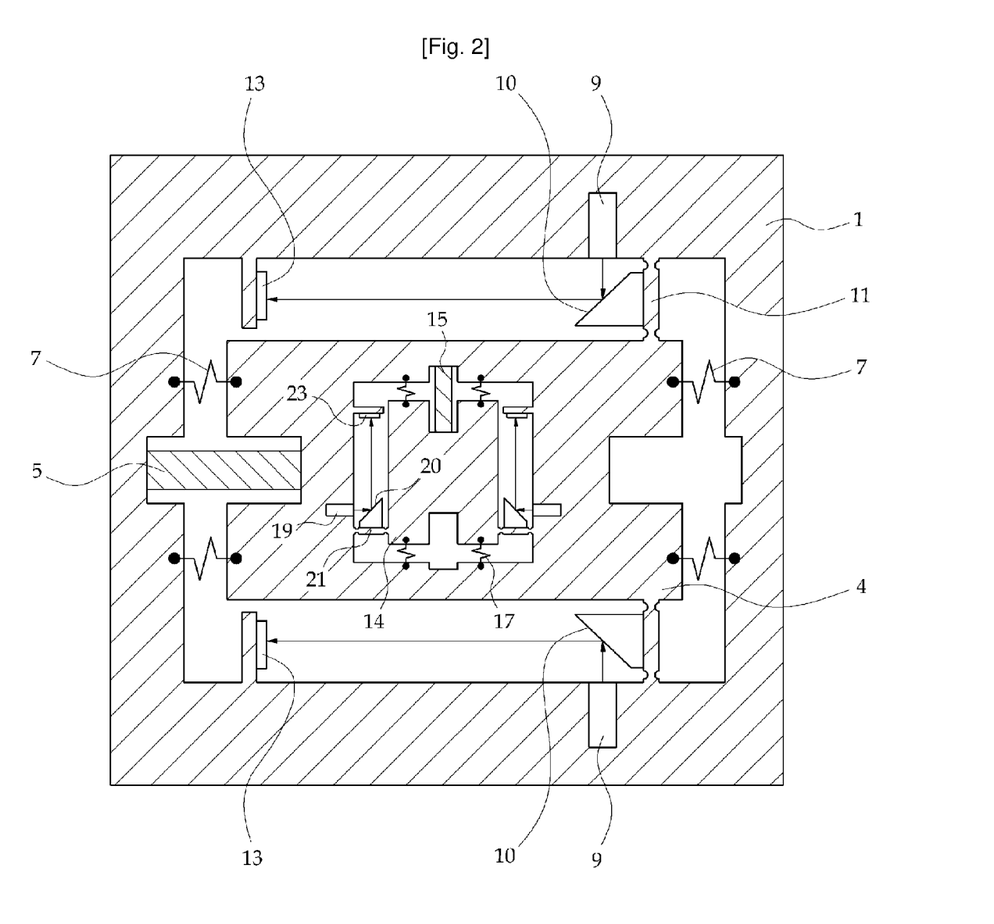
FIG. 2 is a conceptual view showing a stage according to a second embodiment of the present invention.

FIG. 2 is a conceptual view showing a stage according to a second embodiment of the present invention. Although the stage of the first embodiment shown in FIG. 1 measures a unidirectional displacement, the stage of the second embodiment shown in FIG. 2 measures a bidirectional displacement. The stage shown in FIG. 2 includes a fixed base 1, a movable table 4, first elastic supports 7, a first actuator 5, first arms 11, first displacement measuring means, a sub table 14, a second actuator 15, second elastic supports 17, second arms 21, and second displacement measuring means. The fixed base 1, the first elastic supports 7, the first actuator 5, the first arms 11 and the first displacement measuring means in the second embodiment have the same configurations and operations as the components in the first embodiment. In addition, the movable table 14 has the same configuration and operation as that in the first embodiment, except that the movable sub table is provided therein as described later.

The sub table 14 is installed to be movable with respect to the movable table 4 while being spaced apart from the movable table 4. Each of the second elastic support 17 serves as an elastically supporting means and is connected to the movable table 4 and the sub table 14. Thus, the sub table 14 is elastically supported to the movable table 4 by means of the second elastic supports 17. The second actuator 15 that is a means for generating a minute displacement like the first actuator 5 has one end fixed to the movable table 4 and the other end fixed to the sub table 14. At this time, the second actuator 15 is installed such that the generation direction of a minute displacement is perpendicular to the generation direction of a minute displacement by the first actuator 5.

Each of the second arms 21 has one end hingedly connected to the movable table 4 and the other end hingedly connected to the sub table 14.

Each of the second displacement measuring means includes a second light emitting unit 19, a second reflective plate 20, and a second light receiving unit 23. The second reflective plate 20 that is a means for reflecting light is attached to the second arm 21. The second light emitting unit 19 that is a means for generating light is fixed to the movable table 4 so that the generated light is emitted toward the second reflective plate 20. The second light receiving unit 23 is installed on the movable table 4 while being spaced apart by a certain distance from the second reflective plate 20 so as to receive the light that is emitted from the second light emitting unit 19 and reflected by the second reflective plate 20.

When the second actuator 15 generates a displacement, the sub table 14 linearly moves as much as the displacement generated by the second actuator 15. The second displacement measuring means measures the minute displacement of the sub table 14 using the same method as the first displacement measuring means. Since the first actuator 5 and the second actuator 15 generate displacements orthogonal to each other as described above, the stage of the second embodiment can measure all displacements generated in x- and y-axis directions on a plane.

Figure 3:
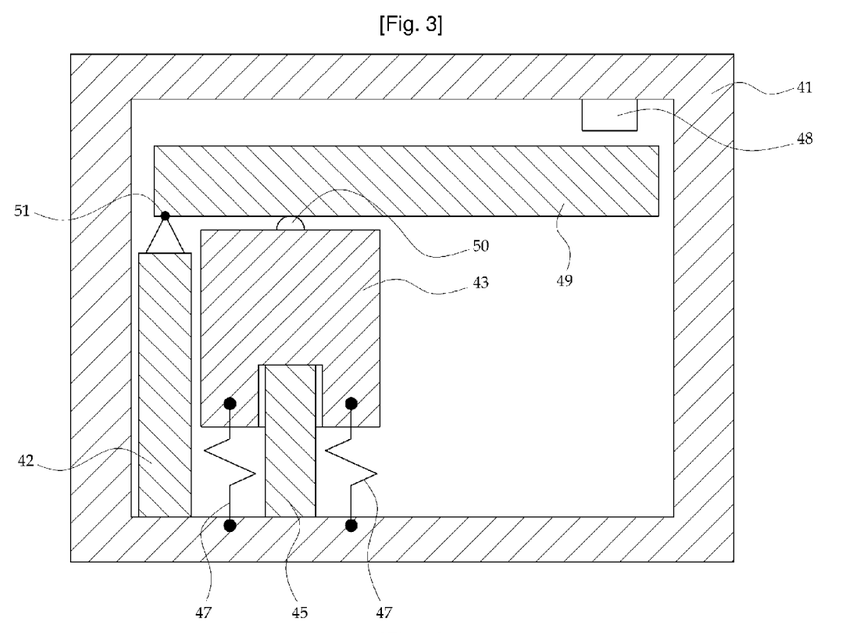
FIG. 3 is a conceptual view showing a stage according to a third embodiment of the present invention.

FIG. 3 is a conceptual view showing a stage according to a third embodiment of the present invention. The stage of the third embodiment includes a fixed base 41, a movable table 43, first elastic supports 47, a first actuator 45, a first converting lever 49, and a first displacement measuring means 48. The movable table 43 is installed to be movable with respect to the fixed base 41 while being spaced apart by a certain distance from the fixed base 41. Each of the first elastic supports 47 serves as an elastic support means and is connected to the fixed base 41 and the movable table 43. Thus, the movable table 43 is elastically supported to the fixed base 41 by means of the first elastic supports 47. The first actuator 45 that is a means for generating a minute displacement as in the first embodiment has one end fixed to the fixed base 41 and the other end fixed to the movable table 43.

The first converting lever 49 has one end connected to the fixed base 41 by a hinge 51, and one side of the first converting lever 49 between the one end and the other end thereof is connected to the other end of the movable table by a hinge 50. In this embodiment, the fixed base 41 has an extension beam 42 to be hingedly connected to the one end of the first converting lever 49. Thus, the one end of the first converting lever 49 is hingedly connected to the beam 42 of the fixed base 41. The first displacement measuring means 48 that is a displacement sensor is attached to the fixed base 41 so as to measure a displacement of the other end of the first converting lever 49.

When the first actuator 45 generates a displacement, the movable table 43 linearly moves as much as the displacement generated by the first actuator 45. The first converting lever 49 has the one end connected to the beam 42 of the fixed base 41 by the hinge 51, and the one side of the first converting lever 49 is connected to the other end of the movable table 43 by the hinge 50. Thus, when the movable table 43 linearly moves, the first converting lever 49 pivots on the one end, and the other end of the first converting lever 49 is rotated about the hinge 51. Thus, the linear displacement of the movable table 43 is converted into a rotational displacement of the first converting lever 49. The displacement of the other end of the first converting lever 49 is proportional to the amount of movement of the movable table 43, and is magnified from the amount of movement of the movable table 43 at a ratio of a distance between the one end and the one side of the first converting lever 49 to a distance between the one side and the other end of the first converting lever 49. Thus, if the ratio is great, the displacement of the movable table 43 is greatly magnified at the other end of the first converting lever 49.

The first displacement measuring means 48 is attached to the fixed base 41 and measures the displacement of the other end of the first converting lever 49. Thus, even though the movable table 43 moves minutely, the displacement of the movable table 43 can be easily measured by measuring the displacement of the other end of the first converting lever 49. In this embodiment, the one end of the first converting lever 49 is connected to the fixed base 41 by the hinge 51 and the one side is coupled to the other side of the movable table 43 by the hinge 50 so that the minute displacement of the movable table 43 is converted into a magnified displacement at the other end of the first converting lever 49. However, the one side of the first converting lever 49 may be hingedly connected to the fixed base and the one end thereof may be hingedly connected to the other side of the movable table 43.

Figure 4:
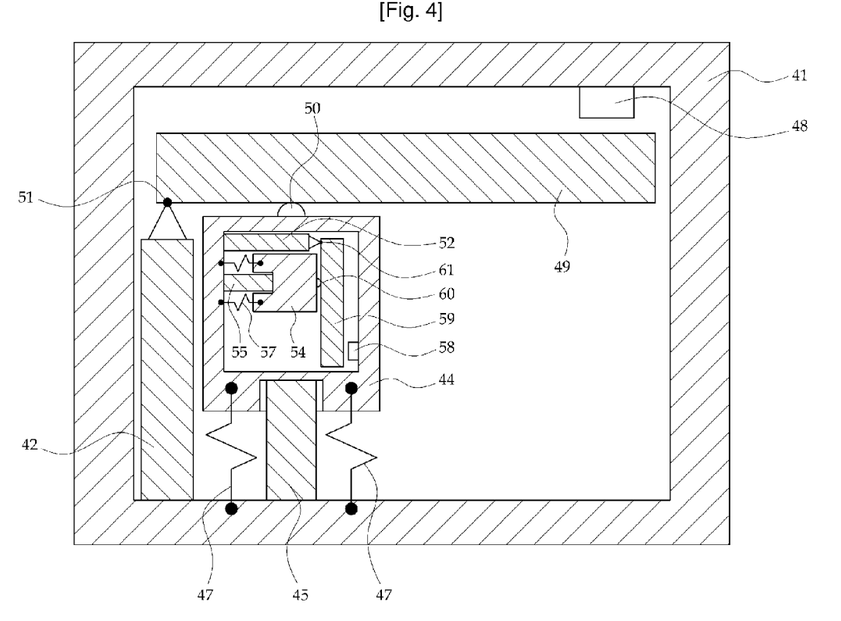
FIG. 4 is a conceptual view showing a stage according to a fourth embodiment of the present invention.

FIG. 4 is a conceptual view showing a stage according to a fourth embodiment of the present invention. Although the stage of the third embodiment shown in FIG. 3 measures a unidirectional displacement, the stage of the fourth embodiment shown in FIG. 4 measures a bidirectional displacement. The stage of FIG. 4 includes a fixed base 41, a movable table 44, first elastic supports 47, a first actuator 45, a first converting lever 49, a first displacement measuring means 48, a sub table 54, a second actuator 55, second elastic supports 57, a second converting lever 59, and a second displacement measuring means 58. The fixed base 41, the first elastic supports 47, the first actuator 45, the first converting lever 49 and the first displacement measuring means 48 in the fourth embodiment have the same configurations and operations as the components in the third embodiment. In addition, the movable table 44 also has the same configuration and operation as that in the third embodiment, except that the movable sub table 54 is provided therein as described later.

The sub table 54 is installed to be movable with respect to the movable table 44 while being spaced apart from the movable table 44. Each of the second elastic support 57 serves as an elastically supporting means and is connected to the movable table 44 and the sub table 54. Thus, the sub table 54 is elastically supported to the movable table 44 by means of the second elastic supports 57. The second actuator 55 that is a means for generating a minute displacement like the first actuator 45 has one end fixed to the movable table 44 and the other end fixed to the sub table 54. At this time, the second actuator 55 is installed such that the generation direction of a minute displacement is perpendicular to the generation direction of a minute displacement by the first actuator 45.

The second converting lever 59 has one end connected to the movable table 44 by a hinge 61, and one side of the second converting lever 59 between the one end and the other end thereof is connected to the other end of the sub table 54 by a hinge 60. In this embodiment, a beam 52 extends from the movable table 44 so as to be hingedly connected to the one end of the second converting lever 59. Thus, one end of the second converting lever 59 is connected to the beam 52 of the movable table 44 by the hinge 61. The second displacement measuring means 58 that is a displacement sensor is attached to the movable table 44 so as to measure a displacement of the other end of the second converting lever 59.

When the second actuator 55 generates a displacement, the sub table 54 linearly moves as much as the displacement generated by the second actuator 55. The second displacement measuring means 48 measures a minute displacement of the sub table 54 using the same method as the first displacement measuring means 48. Since the first actuator 45 and the second actuator 55 generate displacements orthogonal to each other as described above, the stage of the fourth embodiment can measure all displacements generated in x- and y-axis directions on a plane.

Figure 5:
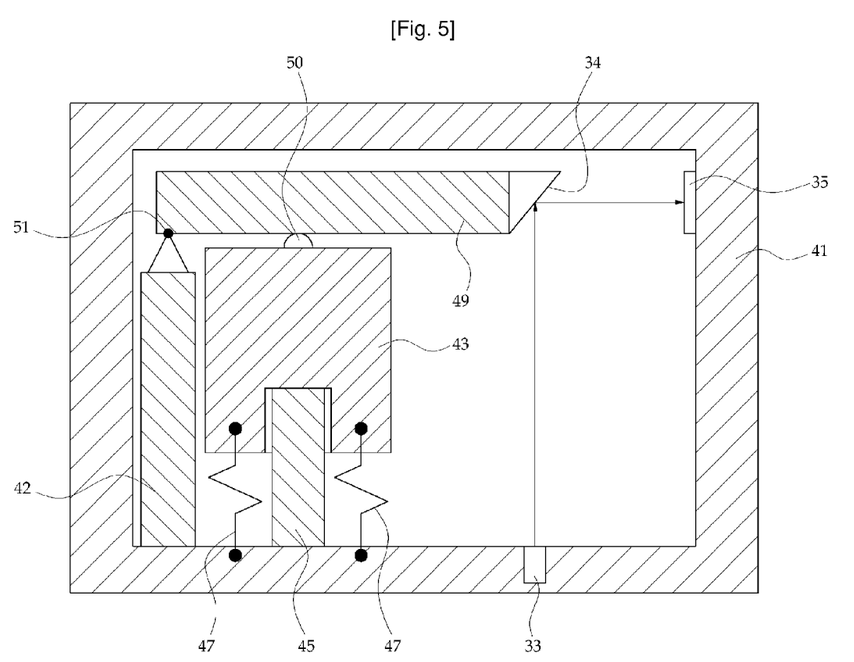
FIG. 5 is a conceptual view showing a stage according to a fifth embodiment of the present invention.

FIG. 5 is a conceptual view showing a stage according to a fifth embodiment of the present invention. The stage of FIG. 5 includes a fixed base 41, a movable table 43, first elastic supports 47, a first actuator 45, a first converting lever 49, and a first displacement measuring means. The stage of the fifth embodiment is a combination of the stage of the first embodiment and the stage of the third embodiment, wherein the fixed base 41, the movable table 43, the first elastic supports 47, the first actuator 45 and the first converting lever 49 in the fifth embodiment have the same configurations and operations as the components in the third embodiment. The first displacement measuring means includes a first light emitting unit 33, a first reflective plate 34 and a first light receiving unit 35. The respective components of the first displacement measuring means in the fifth embodiment have the same configurations and operations as those of the first displacement measuring means in the first embodiment. The first reflective plate 34 is attached to the other end of the first converting lever 49, and the first light emitting unit 33 is fixed to the fixed base 41 so that the generated light is emitted toward the first reflective plate 34. In addition, the first light receiving unit 35 is installed on the fixed base 41 while being spaced apart by a certain distance from the first reflective plate 34 so as to receive the light that is emitted from the first light emitting unit 33 and reflected by the first reflective plate 34.

When the first actuator 45 generates a displacement of the movable table 43, the displacement is primarily magnified into a displacement at the other end of the first converting lever 49 by means of the same mechanism as in the third embodiment. At this time, the first reflective plate 34 attached to the other end of the first converting lever 49 pivots on the hinge 51 at the one end of the first converting lever 49. Thus, the primarily magnified displacement at the other end of the first converting lever 49 is secondarily magnified and then measured by the first light receiving unit 35.

Figure 6:
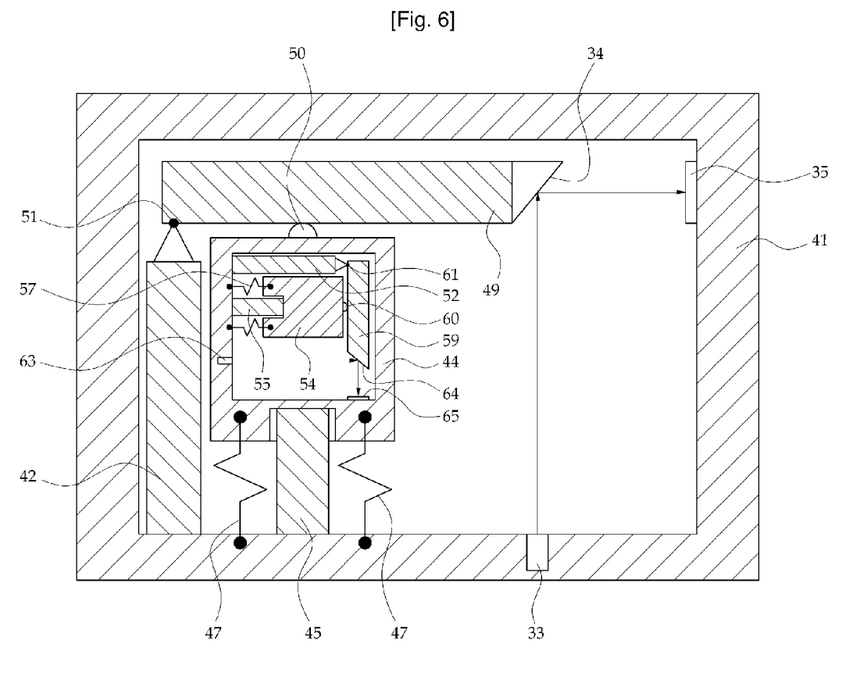
FIG. 6 is a conceptual view showing a stage according to a sixth embodiment of the present invention.

FIG. 6 is a conceptual view showing a stage according to a sixth embodiment of the present invention. The stage of FIG. 6 includes a fixed base 41, a movable table 44, first elastic supports 47, a first actuator 45, a first converting lever 49, a first displacement measuring means, a sub table 54, second elastic supports 57, a second actuator 55, a second converting lever 59, and a second displacement measuring means.

The stage of the sixth embodiment is a combination of the stage of the second embodiment and the stage of the fourth embodiment. The fixed base 41, the movable table 44, the first elastic supports 47, the first actuator 45, the first converting lever 49, the sub table 54, the second actuator 55, the second elastic supports 57 and the second converting lever 59 in the sixth embodiment have the same configurations and operations as the components in the fourth embodiment. In addition, the first displacement measuring means has the same configuration and operation as the displacement measuring means in the fifth embodiment. The second displacement measuring means includes a second light emitting unit 63, a second reflective plate 64 and a second light receiving unit 65, and the second reflective plate 64 is attached to the other end of the second converting lever 59. In addition, the second light emitting unit 63 is fixed to the movable table 44 so that light is emitted toward the second reflective plate 64, and the second light receiving unit 65 is fixed to the movable table 44 so as to receive the light reflected by the second reflective plate 64. Thus, the displacement of the sub table 54 generated by the second actuator 55 is secondarily magnified and then measured.

Figure 7:
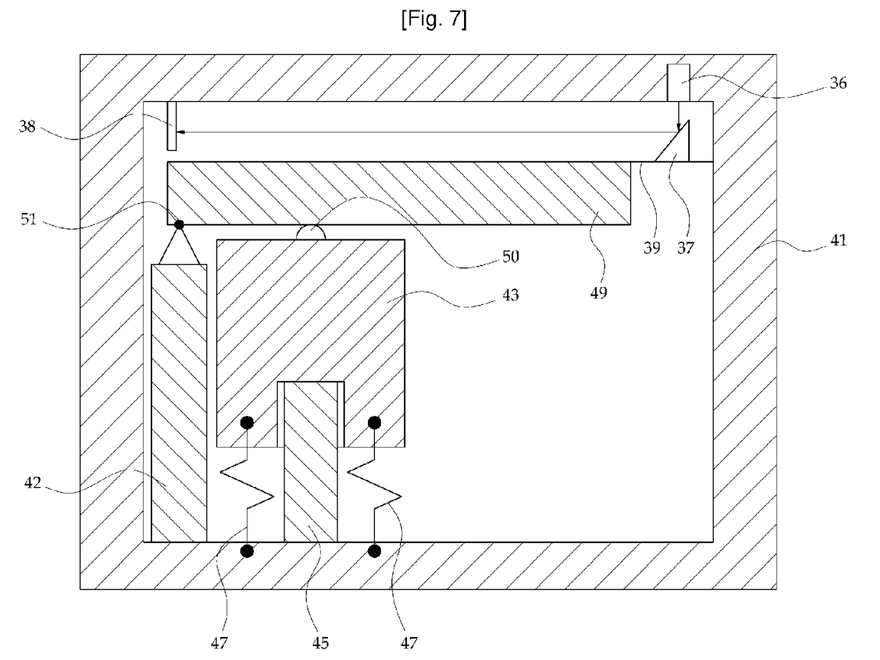
FIG. 7 is a conceptual view showing a stage according to a seventh embodiment of the present invention.

FIG. 7 is a conceptual view showing a stage according to a seventh embodiment of the present invention. The stage of FIG. 7 includes a fixed base 41, a movable table 43, first elastic supports 47, a first actuator 45, a first converting lever 49, a first pivoting rod 39, and a first displacement measuring means. The fixed base 41, the movable table 43, the first elastic supports 47, the first actuator 45, and the first converting lever 49 of the stage of the seventh embodiment are identical to the components in the fifth embodiment. The first pivoting rod 39 has one end hingedly connected to the other end of the first converting lever 49, and the other end hingedly connected to the fixed base 41. Thus, when the first converting lever 49 pivots on the hinge 51 at the one end thereof, the first pivoting rod 39 pivots on the other end hingedly connected to the fixed base 41. The first displacement measuring means includes a first light emitting unit 36, a first reflective plate 37 and a first light receiving unit 38. Contrary to the fifth embodiment, the first reflective plate 37 in the seventh embodiment is attached to the first pivoting rod 39.

In the stage of the seventh embodiment, when a displacement of the movable table 43 is generated by the first actuator 45 as in the fifth embodiment, the displacement is primarily magnified at the other end of the first converting lever 49 and secondarily magnified at the first light receiving unit 38.

Figure 8:
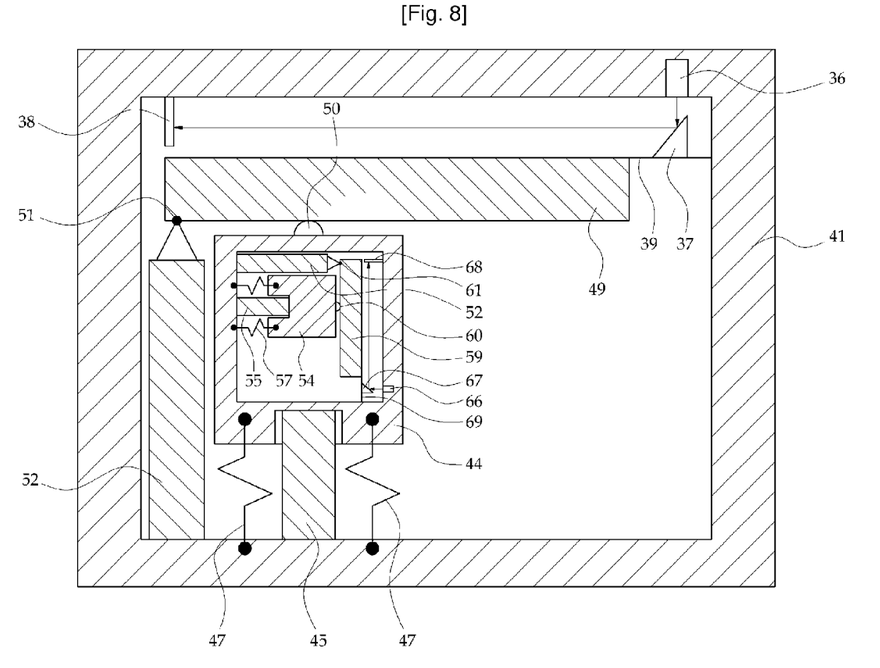
FIG. 8 is a conceptual view showing a stage according to an eighth embodiment of the present invention.

FIG. 8 is a conceptual view showing a stage according to an eighth embodiment of the present invention. The stage of FIG. 8 includes a fixed base 41, a movable table 44, first elastic supports 47, a first actuator 45, a first converting lever 49, a first displacement measuring means, a first pivoting rod 39, a sub table 54, second elastic supports 57, a second actuator 55, a second converting lever 59, a second displacement measuring means, and a second pivoting rod 69.

Although the stage of the seventh embodiment measures a unidirectional displacement, the stage of the eighth embodiment measures a bidirectional displacement. Thus, the stage of the eighth embodiment has the same displacement magnifying mechanism and displacement measuring mechanism as those in the seventh embodiment.

Figure 9:
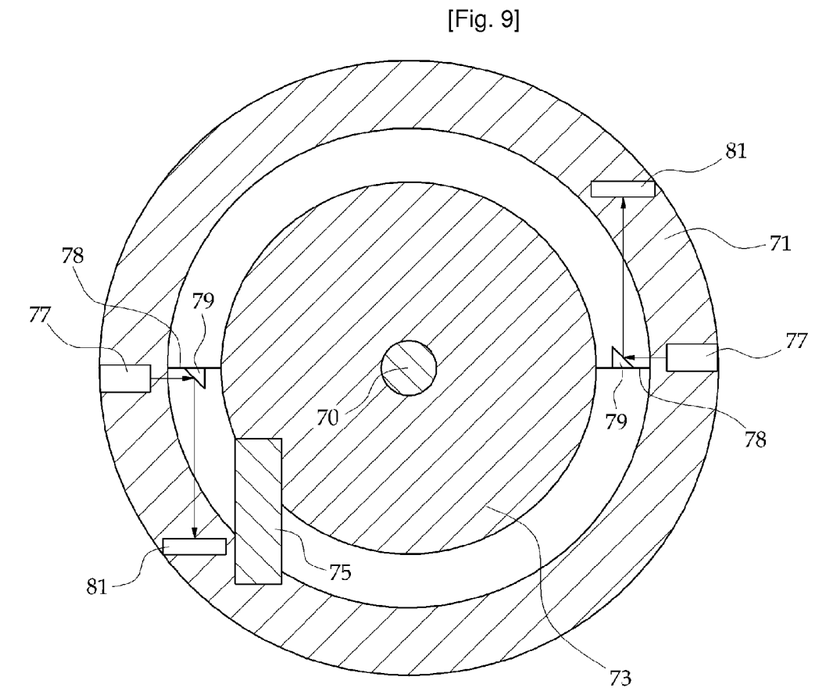
FIG. 9 is a conceptual view showing a stage according to a ninth embodiment of the present invention.

FIG. 9 is a conceptual view showing a stage according to a ninth embodiment of the present invention. The stage of FIG. 9 includes a fixed base 71, a rotating table 73, a first actuator 75, arms 78 and first displacement measuring means.

The rotating table 73 is installed to rotate with respect to the fixed base 71. In this embodiment, the rotating table 73 is installed to rotate about its center 70. The first actuator 75 has one end fixed to the fixed base 71 and the other end fixed to the rotating table 73 so that the rotating table 73 can rotate. Thus, when the first actuator 75 generates a displacement, the rotating table 73 rotates about the center 70. Each of the arms 78 has one end hingedly connected to the fixed base 71 and the other end hingedly connected to the rotating table 73. Thus, when the rotating table 73 rotates, the arm 78 pivots on its one end.

Each of the first displacement measuring means includes a first light emitting unit 77, a first reflective plate 79 and a first light receiving unit 81. The first reflective plate 79 is attached to the arm 78. The first light emitting unit 77 is fixed to the fixed base 71 so that light is emitted toward the first reflective plate 79. The first light receiving unit 81 is installed to the fixed base 71 while being spaced apart by a certain distance from the first reflective plate 79 so as to receive the light reflected by the first reflective plate 79.

When the first actuator 75 generates a displacement, the rotating table 73 is rotated by the first actuator 75. When the rotating table 73 rotates, the arm 78 pivots on the one end hingedly connected to the fixed base 71. When the arm 78 pivots, the first reflective plate 79 attached to the arm 78 also pivots. Thus, the position of the light received by the first light receiving unit 81 is changed. The change in the position of the received light is proportional to a spaced distance between the first light receiving unit 81 and the first reflective plate 79. Thus, if the spaced distance between the first light receiving unit 81 and the first reflective plate 79 increases, the change in the position of the light received by the first light receiving unit 81 is magnified. Therefore, even though the rotating table 73 moves minutely, the minute displacement of the rotating table 73 is magnified in the first light receiving unit 81.

Figure 10:
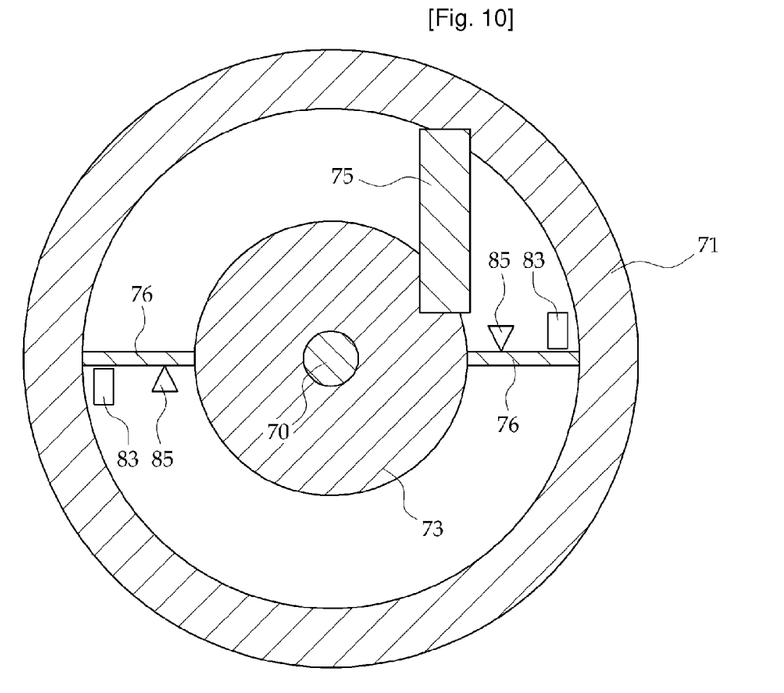
FIG. 10 is a conceptual view showing a stage according to a tenth embodiment of the present invention.

FIG. 10 is a conceptual view showing a stage according to a tenth embodiment of the present invention. The stage of FIG. 10 includes a fixed base 71, a rotating table 73, a first actuator 75, converting levers 76 and first displacement measuring means 83.

The rotating table 73 and the first actuator 75 in the tenth embodiment have the same configurations and operations as the components in the ninth embodiment. In addition, the fixed base 71 is identical to that in the ninth embodiment, except that the fixed base 71 in this embodiment has support beams 85 each of which extends to be hingedly connected to the converting lever 76 at one side.

The converting lever 76 has one end hingedly connected to the movable table, and one side of the converting lever 76 between the one end and the other end thereof is hingedly connected to the support beam 85. Thus, when the rotating table 73 is rotated by the first actuator 75, the converting lever 76 pivots on the support beam 85. The first displacement measuring means 83 that is a displacement sensor is fixed to the fixed base 71 so as to measure a displacement of the other end of the converting lever 76.

When the rotating table 73 is rotated by the first actuator, the other end of the converting lever 76 pivots on the support beam 85 by means of the above mechanism. At this time, the displacement at the other end of the converting lever 76 is magnified from a circumferential displacement of the rotating table 73 at a ratio of a distance between the support beam 85 and the one end of the converting lever 76 to a distance between the support beam 85 and the other end of the converting lever 76. Thus, if the ratio increases, a minute displacement can be measured through magnification.

Figure 11:
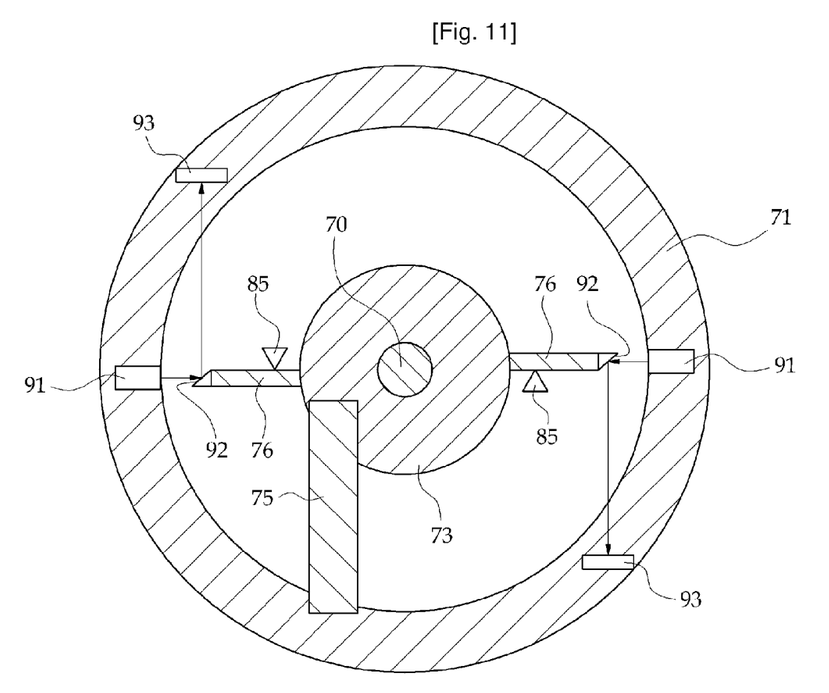
FIG. 11 is a conceptual view showing a stage according to an eleventh embodiment of the present invention.

FIG. 11 is a conceptual view showing a stage according to an eleventh embodiment of the present invention. The stage of FIG. 11 includes a fixed base 71, a rotating table 73, a first actuator 75, converting levers 76 and first displacement measuring means.

The fixed base 71, the rotating table 73, the first actuator 75 and the converting levers 76 in the eleventh embodiment have the same configurations and operations as the components in the tenth embodiment.

Each of the first displacement measuring means includes a first light emitting unit 91, a first reflective plate 92 and a first light receiving unit 93. The first reflective plate 93 is attached to the other end of the converting lever 76, the first light emitting unit 91 is fixed to the fixed base 71 so that light is emitted toward the first reflective plate 93, and the first light receiving unit 93 is fixed to the fixed base 71 so as to receive the light reflected by the first reflective plate 93.

Thus, when the rotating table 73 rotates, a displacement generated by the first actuator 75 is primarily magnified by the converting lever 76 and then secondarily magnified and measured in first light receiving unit 93.

Figure 12:
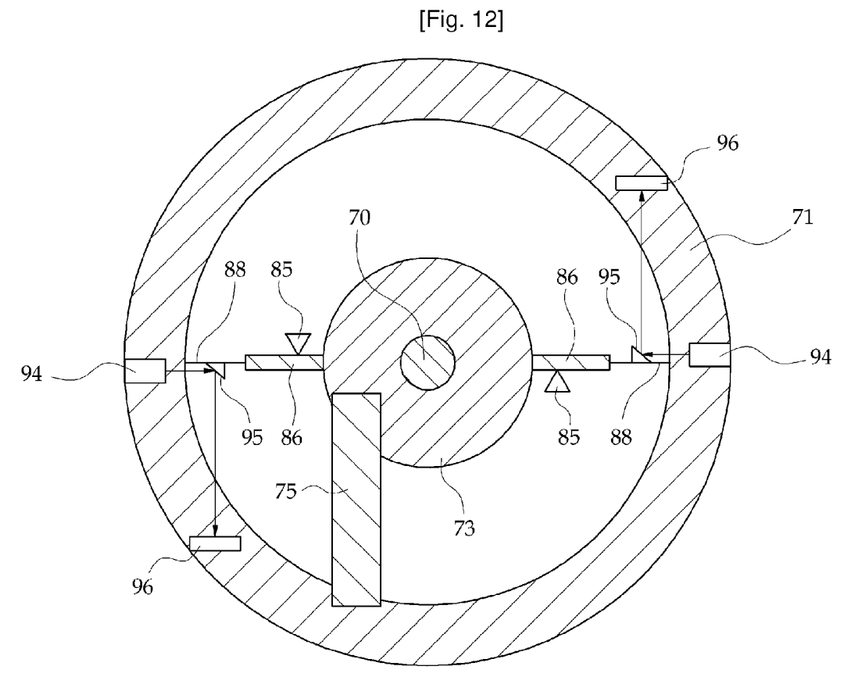
FIG. 12 is a conceptual view showing a stage according to a twelfth embodiment of the present invention.

FIG. 12 is a conceptual view showing a stage according to a twelfth embodiment of the present invention. The stage of FIG. 12 includes a fixed base 71, a rotating table 73, a first actuator 75, converting levers 86, first pivoting rods 88 and first displacement measuring means.

The fixed base 71, the rotating table 73, the first actuator 75 and the converting levers 86 in the twelfth embodiment have the same configurations and operations as the components in the eleventh embodiment.

The first pivoting rod 88 has one end hingedly connected to the other end of the converting lever 86, and the other end hingedly connected to the fixed base 71.

The first displacement measuring means includes a first light emitting unit 94, a first reflective plate 95 and a first light receiving unit 96. The first reflective plate 95 is attached to the first pivoting rod 88, the first light emitting unit 94 is fixed to the fixed base 71 so that light is emitted toward the first reflective plate 95, and the first light receiving unit 96 is fixed to the fixed base 71 so as to receive the light reflected by the first reflective plate 95.

When the rotating table 73 rotates, the converting lever 86 pivots on the support beam 85. Further, the first pivoting rod 88 pivots on the other end hingedly connected to the fixed base 71. Thus, the displacement generated by the first actuator 75 is primarily magnified by the converting lever 86 and then secondarily magnified and measured in the first light receiving unit 96.

INDUSTRIAL APPLICABILITY

The present invention provides a stage provided with a device capable of magnifying and measuring a displacement generated in a feeding table, thereby implementing a high measurement precision using a measurement device with a low precision. Thus, it is possible to implement an inexpensive displacement measuring stage with a high precision.

The embodiments of the present invention that have been described above and illustrated in the drawings should not be construed as limiting the technical spirit of the present invention. The scope of the present invention is limited only by the appended claims, and those skilled in the art can make various modifications and changes within the technical spirit and scope of the present invention. Thus, such modifications and changes fall within the scope of the present invention so far as they are apparent to those skilled in the art.

The invention claimed is:

1. A stage, comprising:
a fixed base;
a movable table installed to be movable with respect to the fixed base;
a first elastic support for supporting the movable table with respect to the fixed base;
a first actuator for generating a displacement of the movable table in one direction;
a first displacement converting means connected to the movable table and the fixed base so as to convert the unidirectional displacement of the movable table into a rotational displacement about a connection point thereof to the fixed base;
a first displacement measuring means attached to the fixed base for measuring the converted rotational displacement;
a sub table installed to be movable with respect to the movable table;
a second elastic support for supporting the sub table with respect to the movable table;
a second actuator for generating a displacement of the sub table in a direction perpendicular to the unidirectional displacement of the movable table;
a second displacement converting means connected to the movable table and the sub table so as to convert a displacement of the sub table into a rotational displacement about a point thereof connected to the movable table; and
a second displacement measuring means for measuring the displacement converted by the second displacement converting means.

2. The stage according to claim 1, wherein the second displacement converting means comprises a rotational displacement converting lever having one end connected to the movable table, and one side of the rotational displacement converting lever between the one end and the other end thereof is connected to the sub table so as to pivot on the one end in proportion to the displacement of the sub table.

3. The stage according to claim 2, wherein the second displacement measuring means comprises a second reflective plate installed at the other end of the converting lever of the second displacement converting means so as to reflect light thereon, a second light emitting unit for emitting light toward the second reflective plate, and a second light receiving unit for receiving the light reflected by the second reflective plate.

4. The stage according to claim 2, wherein the second displacement measuring means measures a displacement of the other end of the converting lever of the second displacement converting means.

5. The stage according to claim 2, further comprising a second pivoting rod having one end hingedly connected to the other end of the converting lever of the second displacement converting means and the other end hingedly connected to one side of the movable table, wherein the second displacement measuring means comprises a second reflective plate installed at the second pivoting rod so as to reflect light thereon, a second light emitting unit for emitting light toward the second reflective plate, and a second light receiving unit for receiving the light reflected by the second reflective plate.

6. The stage according to claim 1, wherein the second displacement converting means comprises a rotational displacement converting means having one side between the one end and the other end thereof connected to the movable table, and the one end of the rotational displacement converting means is connected to the sub table so that the rotational displacement converting means pivots on the one side in proportion to the displacement of the sub table.

7. The stage according to claim 6, wherein the second displacement measuring means comprises a second reflective plate installed at the other end of the converting lever of the second displacement converting means so as to reflect light thereon, a second light emitting unit for emitting light toward the second reflective plate, and a second light receiving unit for receiving the light reflected by the second reflective plate.

8. The stage according to claim 6, wherein the second displacement measuring means measures a displacement of the other end of the converting lever of the second displacement converting means.

9. The stage according to claim 6, further comprising a second pivoting rod having one end hingedly connected to the other end of the converting lever of the second displacement converting means and the other end hingedly connected to one side of the movable table, wherein the second displacement measuring means comprises a second reflective plate installed at the second pivoting rod so as to reflect light thereon, a second light emitting unit for emitting light toward the second reflective plate, and a second light receiving unit for receiving the light reflected by the second reflective plate.

10. The stage according to claim 1, wherein the second displacement measuring means comprises a second reflective plate installed at the second displacement converting means so as to reflect light thereon, a second light emitting unit for emitting light toward the second reflective plate, and a second light receiving unit for receiving the light reflected by the second reflective plate.

11. The stage according to claim 10, wherein the second displacement converting means comprises an arm having one end hingedly connected to the movable table and the other end hingedly connected to the sub table.

* * * * *

UNITED STATES PATENT AND TRADEMARK OFFICE
CERTIFICATE OF CORRECTION

| | | |
|---|---|---|
| PATENT NO. | : 8,089,638 B2 | Page 1 of 1 |
| APPLICATION NO. | : 12/373460 | |
| DATED | : January 3, 2012 | |
| INVENTOR(S) | : Jung Woo Park et al. | |

It is certified that error appears in the above-identified patent and that said Letters Patent is hereby corrected as shown below:

On the title page insert item [73] Assignee:

--Pusan National University Industry University Cooperation Foundation, Busan (KR)--

Signed and Sealed this
Tenth Day of September, 2013

Teresa Stanek Rea
*Acting Director of the United States Patent and Trademark Office*